United States Patent [19]

Terai et al.

[11] 4,452,479
[45] Jun. 5, 1984

[54] GRIPPING DEVICE WITH INTERDIGITATING, ARTICULATE FINGERS

[75] Inventors: Akio Terai; Takashi Miyauchigo; Hiroshi Ota, all of Komatsu, Japan

[73] Assignee: Kabushiki Kaisha Komatsu Seisakusho, Tokyo, Japan

[21] Appl. No.: 324,546

[22] Filed: Nov. 24, 1981

[30] Foreign Application Priority Data

Apr. 14, 1979 [JP] Japan .................................. 54-117283
Sep. 14, 1979 [JP] Japan ............................. 54-126212[U]

[51] Int. Cl.³ ................................................ B25B 1/00
[52] U.S. Cl. ....................................... 294/88; 294/106
[58] Field of Search ................. 294/88, 106, 103, 115, 294/116; 414/732, 735, 738, 739, 744 A, 744 B, 744 C, 909, 1

[56] References Cited

U.S. PATENT DOCUMENTS 3,165,348 1/1965 Keskitalo ............................ 294/106
3,782,567 1/1974 Likas et al. .......................... 294/106

FOREIGN PATENT DOCUMENTS 50-119209 9/1975 Japan .

Primary Examiner—James B. Marbert
Attorney, Agent, or Firm—Armstrong, Nikaido, Marmelstein & Kubovcik

[57] ABSTRACT

A grip attachment to an implement arm of construction or industrial equipment via a swivel coupling comprises three interdigitating, articulate fingers, two pivotable about a first axis and the other pivotable about a second axis parallel to the first. Each finger consists of a first segment pivotable about the first or second axis and a second segment pin-jointed to the first segment. Hydraulic cylinders are employed to cause pivotal motion of the fingers about the first and second axes, and of their second segments relative to the first segments. An additional hydraulic cylinder acts to cause pivotal displacement of the second axis about the first axis, so that the finger pivotable about the second axis can be extended and contracted with respect to the other two fingers.

3 Claims, 4 Drawing Figures

FIG. 3
FIG. 4
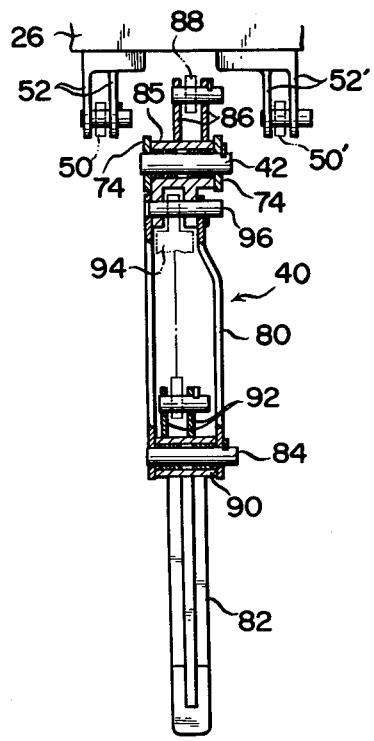
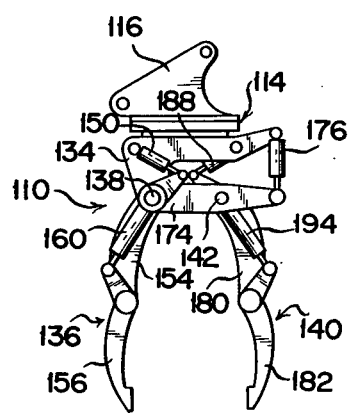

GRIPPING DEVICE WITH INTERDIGITATING, ARTICULATE FINGERS

BACKGROUND OF THE INVENTION

This invention relates to a gripping device particularly suitable for use as an attachment to an implement arm of construction or industrial equipment.

A grip or grapple attachment to an implement arm has been known which comprises rigid or inarticulate arms pivotally movable toward and away from each other between fully open and fully closed positions. With this type of device difficulty has been encountered in adjusting the grapple opening to the size of the object to be gripped, as the arms project considerable distances beyond the object gripped. The placement of the successive objects with respect to the gripping device has also been a problem.

SUMMARY OF THE INVENTION

The present invention has it as an object to provide an improved gripping device or grapple of the class defined which permits easy and precise adjustment of the grapple opening to the size of the object and which can easily and positively grip the successive objects regardless of their placement.

Stated in its simplest form, the gripping device in accordance with the invention comprises a plurality of articulate fingers connected to mounting means for pivotal motion about two parallel axes toward and away from each other. Each articulate finger has a first segment coupled directly to the mounting means and a second segment coupled to the first segment for pivotal motion about an axis parallel to the first mentioned axes. Also included are means, such as fluid actuated cylinders, for pivotally moving the first segments of the fingers relative to the mounting means, and their second segments relative to the first segments.

Preferably, as in the embodiments disclosed herein, a set of two articulate fingers are connected in parallel spaced relation to the mounting means for pivotal motion about a first axis, and a third articulate finger is connected for pivotal motion about a second axis parallel to the first. The three fingers are in interdigitating relation. Thus, by independently manipulating the first and second segments of the three fingers, the gripping device can be made to grip and release a desired object.

The above and other objects, features and advantages of this invention will become more apparent, and the invention itself will best be understood from a study of the following description and appended claims, with reference had to the attached drawings showing some preferred embodiments of the invention.

BRIEF DESCRIPTION OF THE DRAWINGS

FIG. 3 is a right hand side elevational view, partly broken away and partly sectioned for clarity, of the gripping device of FIG. 1; and FIG. 4 is an elevational view of an alternative form of the gripping device in accordance with the invention.

DESCRIPTION OF THE PREFERRED EMBODIMENTS

Figure 1:
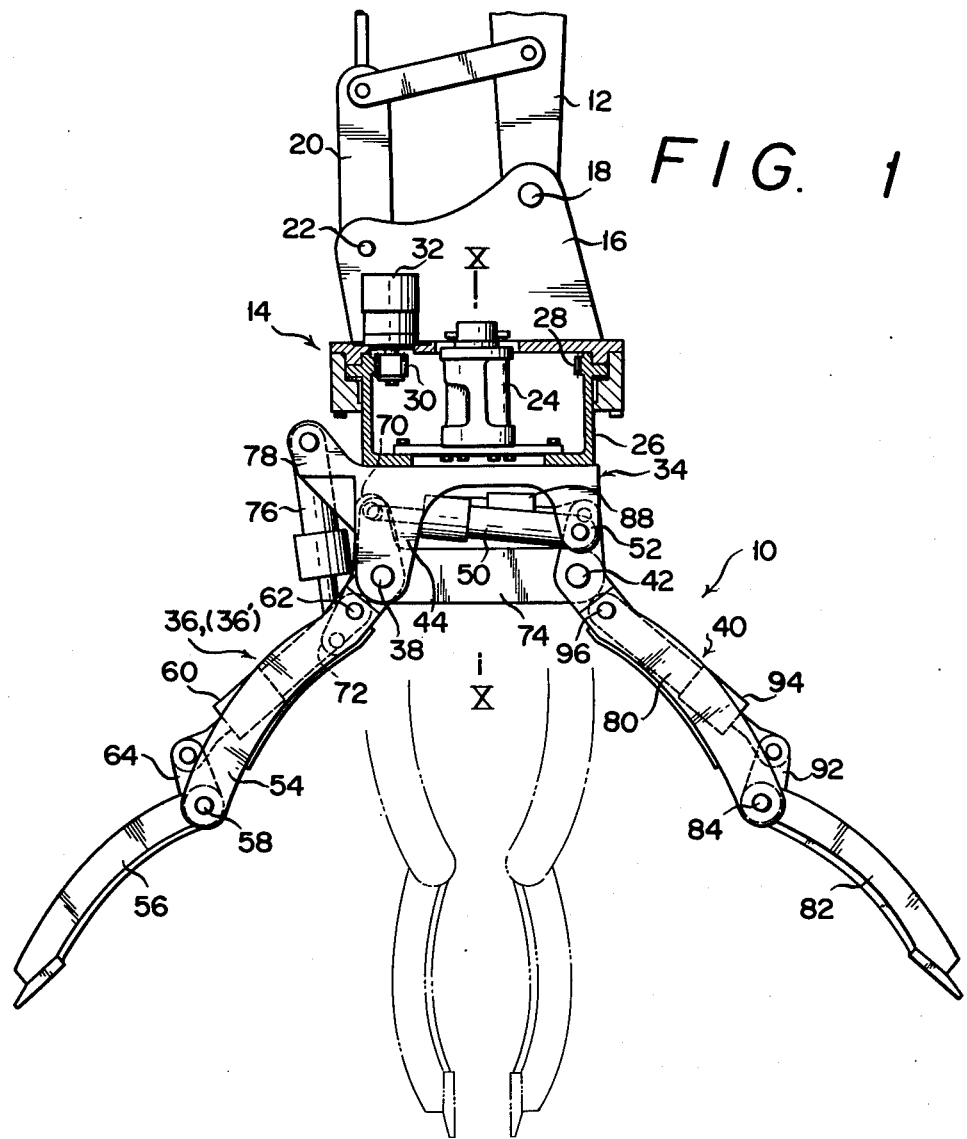
FIG. 1 is an elevational view, partly sectioned for clarity, of the gripping device constructed in accordance with this invention, the gripping device being shown attached to an articulate implement arm to illustrate its typical application.
Figure 2:
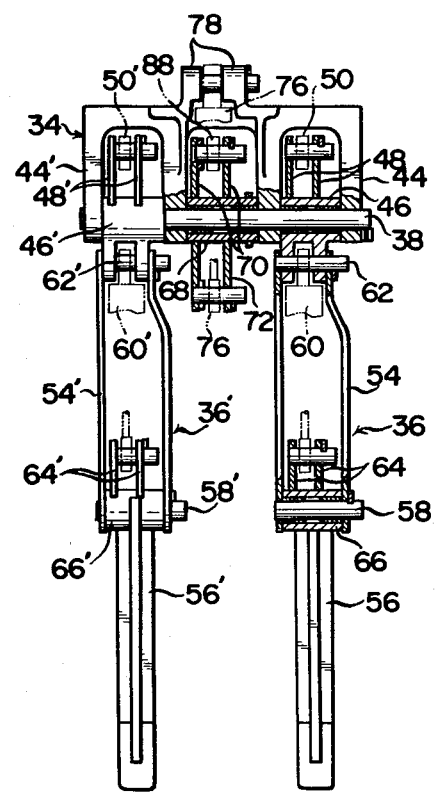
FIG. 2 is a left hand side elevational view, partly broken away and partly sectioned for clarity, of the gripping device of FIG. 1.

FIGS. 1, 2 and 3 illustrate a preferred form of the gripping device in accordance with the invention, generally designated 10 in FIG. 1, as attached to an articulate implement arm or boom 12 via a swivel union 14. The implement arm 12 has a neck structure 16 coupled thereto via a pivot pin 18. Also provided to the implement arm 12 is a tilting linkage 20 which is pin jointed at 22 to the neck structure 16 in order to cause its pivotal or tilting motion about the pin 18. Interposed between the neck structure 16 and the gripping device 10, the swivel union 14 includes a swivel joint 24 housed in a swivel mount 26. This swivel mount is formed integral with an internal gear 28 in mesh with a pinion 30 on the output shaft of a bidirectional motor 32, preferably a hydraulic one. Thus, with the rotation of the motor 32, the swivel mount 26 as well as the gripping device 10 attached thereto revolves about the axis X—X of the swivel joint 24 relative to the neck structure 16.

The gripping device 10 in accordance with the invention broadly comprises:

1. A support structure 34 rigidly fastened to the swivel mount 26.

2. First 36 and second 36' articulate fingers mounted to the support structure 34 in parallel spaced relation to each other, as in FIG. 2, for pivotal motion about a common pivot 38 disposed on one side of the swivel axis X—X.

3. A third articulate finger 40 swingable about a pivot 42, disposed parallel to and normally symmetrically with the pivot 38 of the first 36 and second 36' fingers relative to the swivel axis X—X, and arranged opposite to and in interdigitating relation with the first and second fingers as in FIG. 3.

As will be noted from FIGS. 1 and 2, the support structure 34 is formed to include first 44 and second 44' pairs of depending lugs for nonrotatably carrying the pivot 38. Between these pairs of lugs 44 and 44' sleeves 46 and 46' are rotatably fitted over the pivot 38 and rigidly connected to the first 36 and second 36' articulate fingers respectively, so that these fingers are both swingable about the pivot 38.

Formed integral with the sleeves 46 and 46' are pairs of upstanding lugs 48 and 48' which are pivotally connected to the piston rods of fluid actuated, preferably hydraulic, cylinders 50 and 50' respectively. The head ends of these cylinders are pivotally connected to two other pairs 52 and 52' of depending lugs forming parts of the support structure 34, as will be seen also from FIG. 3. Thus, with the extension and contraction of the cylinders 50 and 50', the first 36 and second 36' articulate fingers swing in both clockwise and counterclockwise directions, as viewed in FIG. 1, about the common piviot 38.

The articulate fingers 36 and 36' comprise first segments 54 and 54' pivoted at 38 and second segments 56 and 56' pin jointed at 58 and 58' to the first segments. The first segments 54 and 54' are pivoted by the respective cylinders 50 and 50'. Additional hydraulic cylinders are provided at 60 and 60' to cause pivotal motion of the second segments 56 and 56' relative to the firsts 54 and 54'. The head ends of these cylinders are pivotally coupled to pins 62 and 62' mounted to the first segments 54 and 54' in the vicinity of the common pivot 38. The piston rods of the cylinders 60 and 60', on the other hand, are pivotally coupled to pairs of lugs 64 and 64' integral with sleeves 66 and 66' rotatably fitted over the pins 58 and 58' joining the first 54 and 54' and second 56 and 56' segments. The second segments 56 and 56' are rigidly coupled to the sleeves 66 and 66'. Consequently, with the extension and contraction of the cylinders 60 and 60', the second segments 56 and 56' pivot about the pins 58 and 58' relative to the first segments 54 and 54'.

The third articulate finger 40 is mounted to the support structure 34 in a different way from the above two fingers 36 and 36'. As best seen in FIG. 2, a sleeve 68 is rotatably fitted over the common pivot 38 of the first 36 and second 36' fingers so as to be caught between the two pairs of depending lugs 44 and 44'. Formed integral with the sleeve 68 are (1) a first pair of upstanding lugs 70, (2) a second pair of depending lugs 72, and (3) a pair of arms 74 normally extending perpendicular to the axis X—X of the swivel joint 24. A hydraulic cylinder 76 is operatively connected between the depending lug pair 72 and a pair of lugs 78 angled upwardly from the support structure 34. This cylinder 76 acts to swing the arm pair 74 about the common pivot 38 of the first 36 and second 36' articulate fingers. The arm pair 74 is in the illustrated normal position when the cylinder 76 is extended.

With reference to both FIGS. 1 and 3 the pivoted arm pair 74 carries on its free end the piviot 42 of the third articulate finger 40 in parallel relation to the pivot 38 of the first 36 and second 36' fingers. This third finger also comprises a first segment 80 and a second segment 82 jointed together by a pin 84 oriented parallel to the pivots 38 and 42. The first segment 80 is substantially integral with a sleeve 85 rotatably fitted over the pivot 42. The sleeve 85 has a pair of upstanding lugs 86 rigidly coupled thereto. Pivotally coupled to this upstanding lug pair is the head end of a hydraulic cylinder 88, the piston rod of which is pivotally coupled to the aforesaid first lug pair 70, FIGS. 1 and 2, on the sleeve 68 around the common pivot 38 of the first 36 and second 36' articulate fingers. Thus the extension and contraction of the cylinder 88 results in the bidirectional pivotal motion of the third articulate finger 40, or of its first segment 80, about the pivot 42 parallel to the pivot 38.

FIG. 3 also reveals a sleeve 90 rotatably fitted over the pin 84 joining the first 80 and second 82 segments of the third finger 40. This sleeve is integral with the second segment 82 and with a pair of lugs 92. A hydraulic cylinder 94 is operatively connected between the lug pair 92 and a pin 96 mounted to the first segment 80 in the vicinity of the pivot 42. It is thus seen that the cylinder 94 acts to cause pivotal motion of the second segment 82 about the pin 84 relative to the first segment 80.

Such being the construction of the gripping device 10 and of the means associated therewith in one of its possible applications, in operation the cylinders 50 and 88 may be extended and contracted to move the three interdigitating, articulate fingers 36, 36' and 40 between the open position depicted by the solid lines in FIG. 1 and the phantom closed position. The second segments 56, 56' and 82 of the three fingers may also be pivoted about the pins 58, 58' and 84, all parallel to the pivots 38 and 42, by the cylinders 60, 60' and 94. Thus actuated, the fingers will grip and release a desired object without the problems heretofore encountered in the art.

Further, upon contraction of the cylinder 76, the arm pair 74 will be pivoted in a clockwise direction, as viewed in FIG. 1, about the common pivot 38 of the first 36 and second 36' fingers. This pivotal motion of the arm pair 74 results in the angular displacement of the pivot 42 of the third finger 40 and, consequently, in the downward extension of the third finger. Such extension of the third finger beyond the other two fingers may be desired in some use of the gripping device. This third finger may therefore be considered to be of three segments jointed together in series, including the arm pair 74. It will also be seen that the complete gripping device 10 can be tilted relative to the implement arm 12 by the tilting linkage 20 and revolved relative to the neck structure 16 by the swivel union 14. The tilting and revolving mechanism are intended to add to the operating efficiency of the gripping device.

In FIG. 4 is shown another preferable embodiment of the invention, including a modified gripping device 110 coupled to a neck structure 116 via a swivel union 114. The modified gripping device 110 has a support structure 134 carrying a common pivot 138 of first 136 and second (unseen) articulate fingers. The first segment 154 of the first finger 136, as well as the first segment of the unseen second finger, extends beyond the pivot 138 and is coupled to a hydraulic cylinder 150 thereby to be pivoted about the pivot 138. The second segment 156 of the first finger 136, as well as the second segment of the unseen second finger, is pivoted relative to the first segment 154 by a hydraulic cylinder 160 connected at one end to the common pivot 138 of the first and second fingers.

A pair of arms 174 are connected to the support structure 134 for pivotal motion about the pivot 138. A third articulate finger 140, or its first segment 180, is pivoted at 142 to the arm pair 174 and coupled to a hydraulic cylinder 188 thereby to be turned about the pivot 142. Connected at one end to the pivot 142, a hydraulic cylinder 194 acts to cause pivotal motion of the second segment 182 of the third finger relative to its first segment 180. An additional hydraulic cylinder 176 extends between the support structure 134 and the arm pair 174 to cause the angular displacement of the latter about the pivot 138.

It will have been seen that the modified gripping device 110 is analogous with the original device 10 except that the cylinders 160 and 194 for pivotally moving the second segments of the three fingers relative to their first segments are each pivotally connected at one end to either of the pivots 138 and 142 of the first segments. The other details of construction and operation are substantially as set forth above in connection with FIGS. 1 to 3.

It is to be understood that the preferred embodiments disclosed herein are meant purely to illustrate or explain and not to impose limitations upon the invention, since a variety of modifications or changes will readily occur to one skilled in the art on the basis of this disclosure. For example, the gripping device may incorporate any desired number of articulate fingers other than three, without departing from the spirit or scope of the invention as expressed in the following claims.

What is claimed is:

1. A gripping device as for attachment to an implement arm or the like, comprising:
    (a) mounting means;
    (b) at least two parallel spaced articulate fingers connected to the mounting means for pivotal motion about a first pivot;
    (c) at least one other articulate finger connected to the mounting means for pivotal motion about a second pivot parallel to the first pivot and disposed in interdigitating relation with the first recited two articulating fingers;

(d) each of the articulate fingers having a first segment pivotable about the first or second pivot and a second segment pivotally connected to the first segment;

(e) means for pivotally moving the first segments of the articulate fingers relative to the mounting means;

(f) means for pivotally moving the second segments of the articulate fingers relative to the first segments thereof; and (g) means for pivotally moving the second pivot about the first pivot.

2. The gripping device as recited in claim 1, wherein the pivotally moving means comprise fluid actuated cylinders.

3. The gripping device as recited in claim 2, wherein the fluid actuated cylinders for pivotally moving the second segments of the articulate fingers relative to the first segments thereof are each pivotally connected at one end to either of the first and second pivots.

* * * * *